United States Patent [19]

Crawford et al.

[11] 4,154,589
[45] May 15, 1979

[54] BAG TYPE AIR CLEANING APPARATUS

[75] Inventors: G. Roger Crawford; Duane Sanders, both of Spokane, Wash.

[73] Assignee: Thermoguard Insulation Co., Spokane, Wash.

[21] Appl. No.: 864,431

[22] Filed: Dec. 27, 1977

[51] Int. Cl.² .......................................... B01D 46/04
[52] U.S. Cl. .................................... 55/287; 55/294; 55/337; 55/379; 55/431; 55/432
[58] Field of Search ................ 55/284, 286, 287, 294, 55/295, 302, 337, 379, 431, 432

[56] References Cited

U.S. PATENT DOCUMENTS

| 540,720 | 6/1895 | Clark | 55/302 |
|---|---|---|---|
| 1,781,430 | 11/1930 | Blaney | 55/287 |
| 2,369,649 | 2/1945 | Abrams | 55/287 |
| 2,534,600 | 12/1950 | Hutchings | 55/287 |
| 2,867,288 | 1/1959 | Turner | 55/294 |
| 3,292,348 | 12/1966 | Normand | 55/379 |
| 3,487,609 | 1/1970 | Caplan | 55/294 |
| 3,648,442 | 3/1972 | Bourne | 55/302 |
| 3,793,811 | 2/1974 | Bourne | 55/294 |
| 3,854,910 | 12/1974 | Hammerquist | 55/287 |
| 3,871,845 | 3/1975 | Clarke et al. | 55/284 |

FOREIGN PATENT DOCUMENTS

| 903890 | 7/1949 | Fed. Rep. of Germany | 55/302 |
|---|---|---|---|
| 2309267 | 4/1975 | France | 55/294 |
| 1023083 | 11/1963 | United Kingdom | 55/379 |

Primary Examiner—Frank W. Lutter
Assistant Examiner—David L. Lacey
Attorney, Agent, or Firm—Wells, St. John & Roberts

[57] ABSTRACT

A bag type air cleaning apparatus is described for collecting particulate sediment from a source of pressurized air. The apparatus is adapted for connection to the pressurized air source and receives the pressurized air within a cylindrical plenum. A plurality of upright pervious bags are openly associated with the plenum for receiving the pressurized air. The air and particulate sediment is forced upwardly into the bags and against the bag interior surfaces where the sediment will collect as the air escapes through the pervious material. The bags are mounted on upright frames that are collapsible for storage purposes. A sliding duct is provided in communication with a blower mechanism in order to successively clean the inside surfaces of the bags. The sliding duct includes a manifold that comes into contact with successive openings of the bags while being pivoted about within the plenum. The manifold is connected to the blower mechanism which produces a suction force to reverse the pressure within the successive bags. The sediment is thereby pulled from the inside walls of the bags and is delivered through the sliding duct to a discharge. In addition, sediment will settle on the bottom or floor of the plenum. This sediment is gathered and delivered by an auger mechanism to the same discharge. A biased valve is associated with the auger to close and open alternately in response to outward pressure produced by the sediment being forced outwardly by the auger. Thus the sediment received from the sliding duct and from the auger is passed through the same discharge and is disposed of by the same blower mechanism.

4 Claims, 8 Drawing Figures

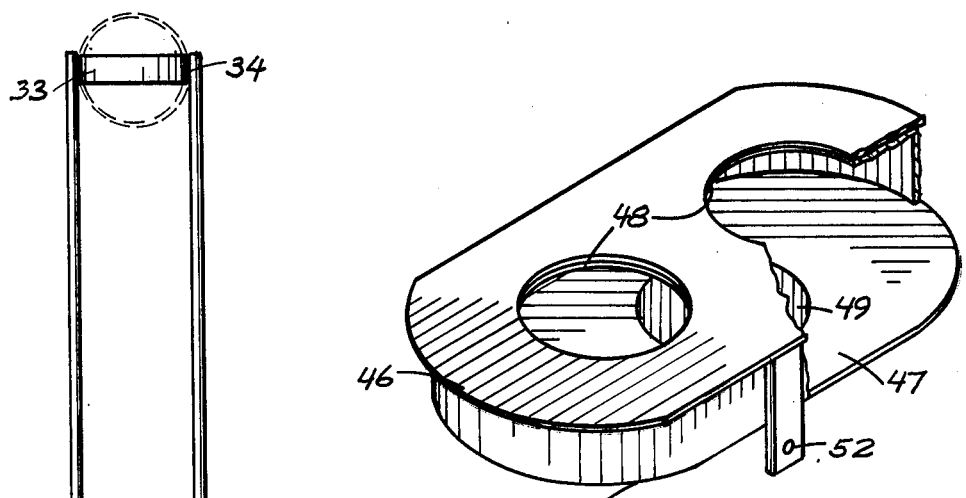
FIG. 7
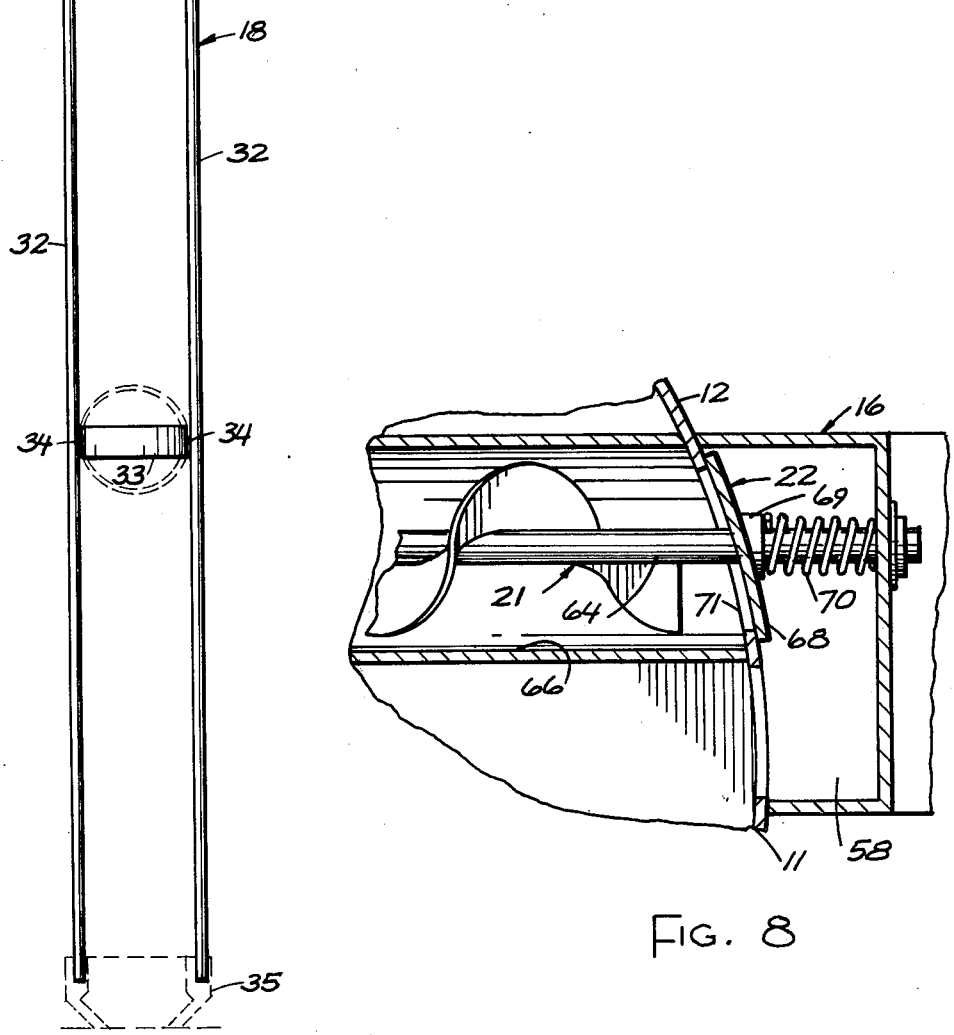
FIG. 6
FIG. 8

BAG TYPE AIR CLEANING APPARATUS

BACKGROUND OF THE INVENTION

The present invention relates basically to air cleaning apparatus for removing particulate matter such as dust and larger particles from an airstream and more particularly to such apparatus utilizing bag type cleaning arrangements.

Growing concern over air pollution by both governmental agencies and private interests have led manufacturers to seek new forms of antipollution equipment. Air has been previously cleaned through utilization of cyclone type centrifugal dust collectors. Such equipment is satisfactory for collecting large particles from an airstream. However, when such particles are relatively lightweight or are fine and easily carried in an airstream, the centrifugal form of collector becomes inefficient.

Air bag type dust collectors have come into use most recently for the purpose of collecting and disposing of finer particulate matter found in airstreams. This form of air cleaner directs the pressurized air into a porous or pervious bag. The air is allowed to escape through the bag material while dust and other sediment is collected on the interior bag walls. The problem, of course, is keeping the interior wall of the bags at least relatively clean to enable passage of the air through the bag material. To accomplish this function, a suction mechanism is usually provided that is operated to periodically seal the bag from the pressurized air source and produce a suction within the bag to reverse the airflow and draw the particulate sediment off the bag interior walls. The collected sediment is then discharged for further processing or disposal.

BRIEF DESCRIPTION OF THE DRAWINGS

FIG. 6 is an enlarged detailed view of the bag support;
FIG. 7 is a pictorial fragmentary view of a duct manifold;
and
FIG. 8 is a fragmentary enlarged sectional view taken along line 8—8 in FIG. 5.

DESCRIPTION OF A PREFERRED EMBODIMENT

Figure 1:
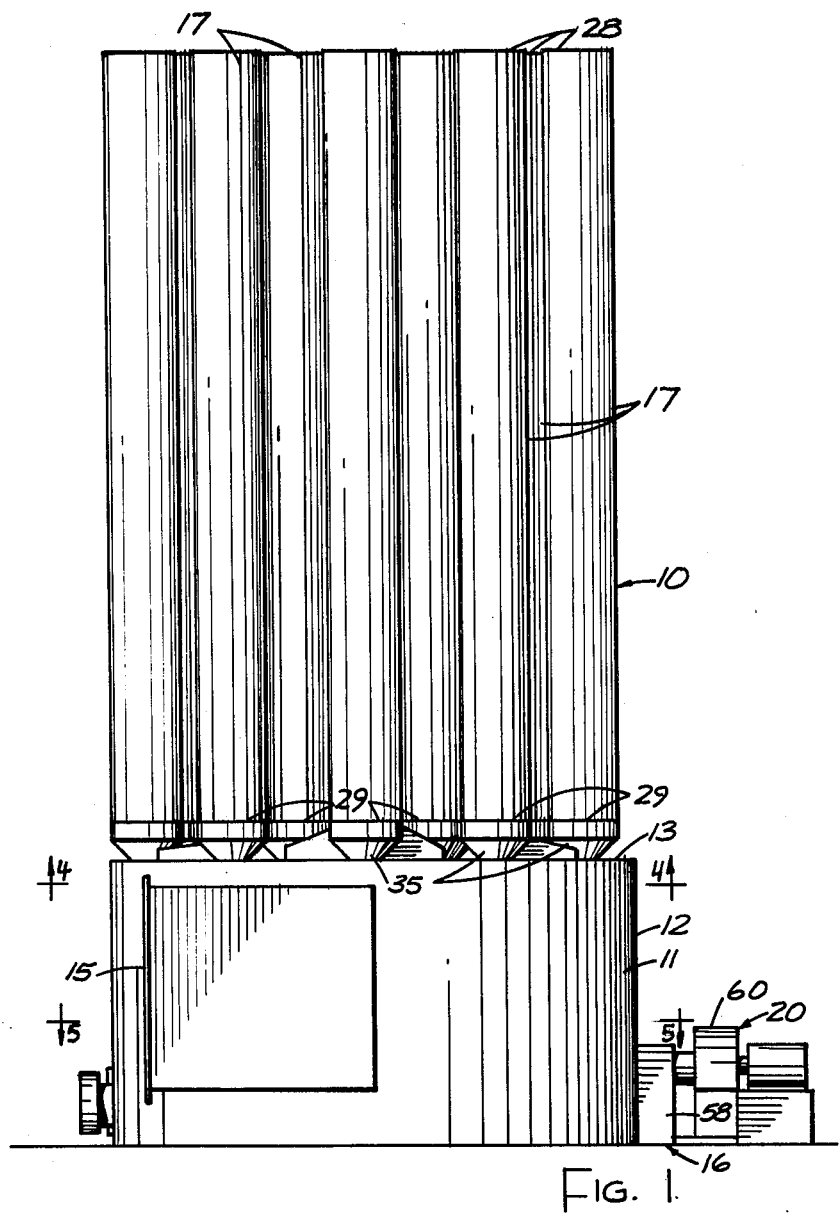
FIG. 1 is an elevational view of the present invention.
Figure 2:
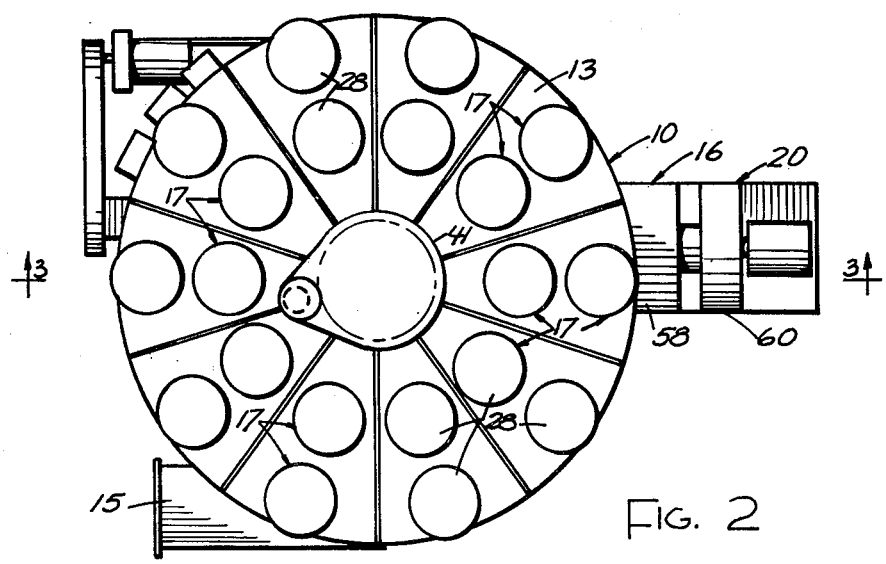
FIG. 2 is a plan view as seen from above in FIG. 1.

A preferred form of the present invention is illustrated in the accompanying drawings and is designated therein by the reference character 10. The apparatus 10 includes a cylindrical plenum 11 formed by an upright wall 12, a top cover 13, and a floor 14. Pressurized air is received by the plenum through a tangential intake 15. Particulate sediment is discharged from the apparatus 10 through a selectively open discharge 16. Both the intake 15 and discharge 16 communicate with the plenum interior.

A plurality of pervious bags 17 are supported on the plenum 11. These bags are formed of a pervious fabric that will allow escape of air but prevent escape of particulate sediment carried by the air. The bags 17 are mounted on upright supports 18 and openly communicate with the plenum interior.

A duct means 19 is provided in conjunction with an auger means 21 and valve means 22 to collect and discharge the particulate sediment received by the bags 17. A sediment gathering means 23 aids by feeding sediment to the auger means 21. Both auger means 21 and duct means 19 deliver sediment to the same discharge 16.

The bags 17 fit relatively loosely over the supports 18. Each bag includes a closed top 28 and an open bottom end 29. The open bottom end 29 of each bag is situated directly adjacent to a plenum exit opening 30 formed through the cover 13. Thus, the interior of the bags 17 normally openly communicates with the plenum interior.

The bag supports 18 are comprised of paired upright support frames 32 (FIG. 6) for each bag 17. A number of bag expansion hoops 33 are pivotally mounted between the frames (FIG. 6). The hoops 33 are pivoted at pins 34 on the frames for movement between operative horizontal positions for engaging and holding the bags in an open condition, and vertical positions as shown in dashed lines in FIG. 6 wherein the frames may be removed and easily stored. In the operative condition, the hoops lie within planes that are substantially perpendicular to the longitudinal dimension of the bags. In the storage condition, the hoops lie within planes substantially parallel to the longitudinal dimension of the bags.

The bags and supports are removably mounted to the plenum to facilitate transportation, storage, and cleaning. Mounting brackets 35 are provided on the plenum cover 13 to releasably receive the bag support frame members 32. These brackets 35 also enable secure mounting of the open bag ends 29.

Figure 3:
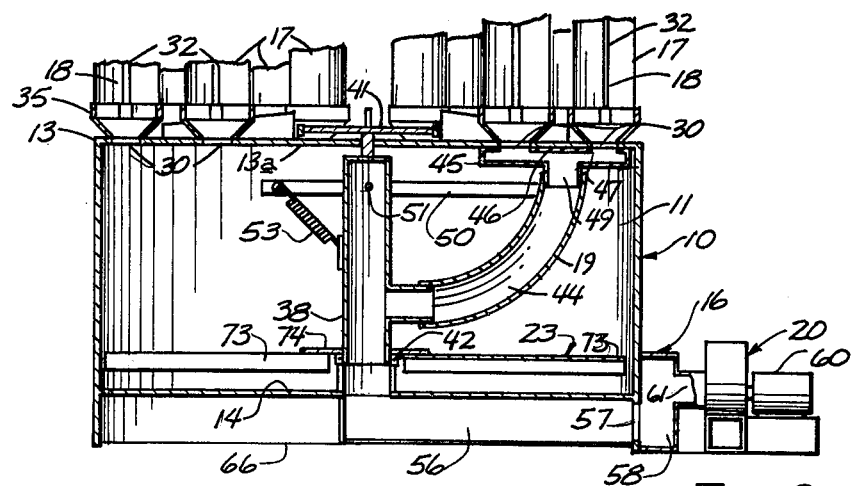
FIG. 3 is a fragmented sectional view taken substantially along line 3—3 in FIG. 2.
Figure 4:
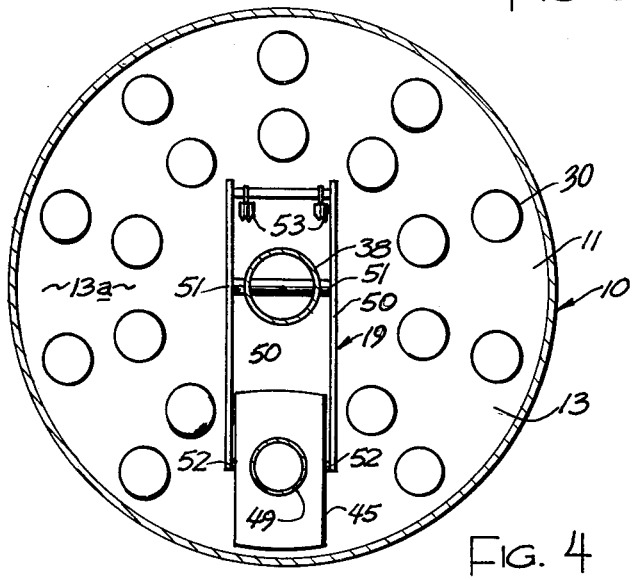
FIG. 4 is a sectional view taken along line 4—4 in FIG. 1.

The duct means 19 is illustrated in substantial detail in FIGS. 3, 4 and 7. Duct means 19 includes an upright central post 38 that is rotated by a drive mechanism 41 (FIG. 3). Post 38 is journalled centrally on the plenum axis by a bearing 42 (FIG. 3) on the floor 14. The post 38 is hollow along its length and openly communicates through a flexible duct tube 44 to a radially positioned double opening manifold 45.

The manifold 45 is designed to slide freely across the inside surface 13a of the top cover 13. It includes a sliding bearing plate 46 that moves frictionally over the interior cover surface 13a. The plate 46 may be constructed of a synthetic resin material to reduce wear and present a relatively low coefficient of friction. The manifold also includes an open chamber 47 communicating with two openings 48 in the plate 46 and a single duct 49 that openly connects to the flexible duct tube 44.

The openings 48 are radially positioned in relation to the rotational axis of post 38. Thus, when the post is rotated, the manifold 45 angularly moves about the post axis to successively index the manifold openings 48 into communication with the angularly-spaced plenum exit openings 30. This is possible because the bags and plenum exit openings 30 are arranged in radial pairs equally angularly spaced about the center of the plenum or post 38. Therefore, the manifold will move on a fixed radius from one pair of openings to the next.

The manifold 45 is supported by a pair of radial duct support arms 50 pivotally mounted to the central post 38. Pivots 51 are provided on post 38 to mount the arms 50 while the manifold 45 is carried at the outward ends of the arms on pivots 52. Springs 53 are provided connecting the opposite ends of the arms to the central post 38. Springs 53 serve to urge the manifold 45 upwardly into frictional engagement with the inside surface 13a of top cover 13.

The central post 38 openly communicates with a duct 56 that extends below the floor 14 to the discharge 16. An opening 57 is formed through the plenum upright wall 12 connecting duct 56 with a discharge chamber 58 of discharge 16. The suction means 20 includes a blower 60. Blower 60 has its intake 61 in communication with the discharge chamber 58. The blower 60 functions to produce a suction within the chamber 58 which is transmitted through the various ducts to the manifold 45 to produce the suction required to clean the successive pairs of bags 17. The blower 60 will operate continuously to produce the suction. As the manifold is moved about, the manifold openings 48 successively communicate with the plenum exit openings 30 with the manifold plate 46 forming an air seal with the cover 13. The blower 60 will then produce a negative pressure within the bags, thereby pulling the gathered sediment inwardly through the ducts and finally out the discharge 16.

The drive 41, like blower 60, is operated continuously. Therefore, the cleaning action provided by the duct means 19 is continuous during operation of apparatus 10. Before a freshly cleaned pair of bags can accumulate an excessive amount of particulate sediment on their inside walls, the manifold will have made a complete circuit about the post axis and the same bags will be cleaned again.

Figure 5:
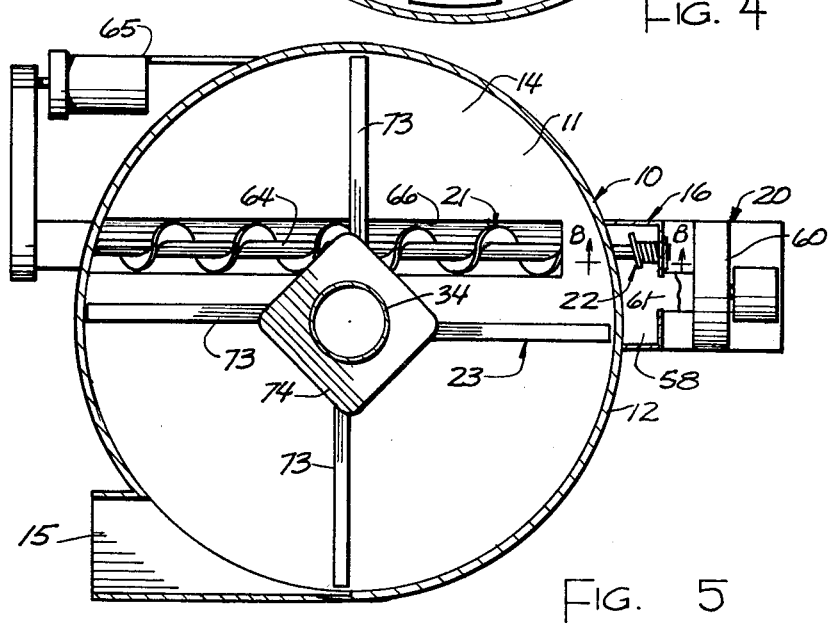
FIG. 5 is a sectional view taken along line 5—5 in FIG. 1.

The auger means 21 is illustrated in FIGS. 5 and 8. Auger means 21 includes an auger shaft 64 that is continuously rotated by a drive mechanism 65. The auger shaft 64 is received within an upwardly open trough 66 formed in the floor 14. The duct 56 and trough 66 are at the same approximate elevation and both communicate with the discharge chamber 58. However, the auger means is normally closed to the discharge chamber 58 through provision of the valve means 22.

The valve means 22 is illustrated particularly in FIGS. 5 and 8. It includes a slidable plate 68 mounted on a sleeve 69. The sleeve is slidably held on the auger shaft 64 and is biased against the upright wall 12 by a spring 70. The plate 68 normally covers an opening 71 formed through the wall 12. When no material is being forced through the trough, the plate 68 will seal the chamber to allow the normal functioning of sliding duct means 19 and the associated blower 60. Thus, the valve means enables use of the single blower unit 60 to exhaust the sediment and maximizes the amount of suction produced for the cleaning function of the sliding duct means 19.

The valve means functions to open under pressure of sediment being forced against the plate 68 due to operation of the auger shaft 64. When this occurs, the plate 68 and sleeve 69 will slide toward the open position illustrated in FIG. 5. This allows passage of the particulate material into the discharge chamber 58, yet the opening 71 remains closed to free passage of air by the agglomerated particulate material. When the material is exhausted from the auger, plate 68 will slide to the closed position of FIG. 8.

The air and suspended particulate matter entering the apparatus is first received in the plenum and directed tangentially about the upright wall 12. During this action, larger particles of the sediment will settle onto the floor 14. The sediment gathering means 23 is provided in operative communication with the central post 38 to collect this sediment from the floor and deliver it to the auger means 21. The sediment gathering means 23 includes radial arms 73 rigidly mounted to the post 38 through a mounting plate 74. The arms 73 are located just slightly elevationally off the floor 14. The particulate material will be scraped across the floor 14 and will drop into the trough 66 as the post is rotated.

In operation, the apparatus 10 is connected to a source of pressurized air. This is done simply by connecting the intake 15 to an existing air duct previously utilized to transfer air and suspended particulate matter from one location to another. The apparatus is particularly effective in processing air leaving a cyclone cleaner. The air is directed tangentially into the plenum through the intake 15. The cylindrical configuration of plenum 11 serves to produce a centrifugal separation effect and the larger particulate sediment will fall out of suspension with the air and settle on the floor surface 14. The pressurized air inflates and pressurizes the bags 17. Air will exit through the bags and the finer particulate sediment will be collected on the inside of the bag material.

The heavier sediment falling on the floor 14 will be directed to the auger means 21 by the gathering means 23 and discharged through valve means 22 to the discharge chamber 58. Operation of the blower 60 will then serve to transport this material on for further processing or disposal.

The finer particulate material that has been collected within the bags 17 is successively drawn through the sliding duct means 19 through operation of the same blower 60. The drive 41 rotates the central post 38 and attached manifold 45 continuously within the plenum so the manifold will come in contact and communicate with the successive radially oriented pairs of bags 17. The suction produced through blower 60 reverses the pressure gradient across the bag wall and draws air into the bags dislodging the small particulate sediment. This air and sediment is drawn through the manifold 45, duct 44, post 38, duct 56, and finally to the discharge chamber 58 where it is exhausted by the blower 60.

The suction force produced by blower 60 is not interfered with and is isolated from the pressure within plenum 11 by the valve means 22. The plate 68 will only open in response to outward force of the heavier particulate material, so a relatively continuous seal is maintained between the discharge chamber 58 and plenum 11. The instant the opening 71 becomes clear of particulate matter, the spring 70 will force plate 58 back into engagement with the wall 12 to again seal the chamber 61.

It can be understood from the above description that an advantage of the present apparatus is in its simplicity. The total discharge of collected particulate sediment from the apparatus is effected by the single blower 60. The heavier particulate matter is collected in the plenum and discharged by the auger means 21 and valve means 22. Lighter particulate sediment collected within the bags 17 is collected and drawn through the several ducts to the same discharge chamber 58. The functioning of the blower 60 to accomplish this suction function is not interrupted through provision of the valve means 22 since it or the material itself maintains a seal between the two areas. Therefore, the pressurized air being fed into the apparatus is discharged almost exclusively through the pervious bags 17 and not through the blower 60. Furthermore, the efficiency of the blower for producing the suction force is not interfered with from the pressurized air within the plenum through functioning of the valve means 22. The end result is a very efficiently operating and extremely simplified bag type air cleaning apparatus.

Various forms and arrangements of the different components of the invention may be envisioned from reading the above description and examination of the accompanying drawings. However, modifications fall within the scope of the appended claims which are to be taken as strict definitions of the invention.

What we claim is:

1. A bag type air cleaning apparatus for removing light and heavy particulate material from an air stream, comprising:

a cylindrical plenum having a floor, an upright cylindrical side wall coaxial with a plenum axis, and a top cover having an interior surface;

a tangential intake formed in the upright cylindrical side wall for directing the air stream tangentially into the plenum and to cause the air stream to flow angularly about the inside of the plenum to thereby enable the heavy particulate material to separate from the air stream and settle onto the floor;

means positioned and arranged with respect to the floor for removing the separated heavy particulate material from the plenum;

said top cover having a plurality of angularly-spaced plenum exit openings formed therein radially spaced from the plenum axis for enabling the air stream to exit from the plenum therethrough;

a plurality of upright bag supports mounted on the top cover with each support being located over a corresponding plenum exit opening;

a plurality of air-pervious bags mounted over the bag supports with each bag having an upper closed end and an open lower end that openly communicates with the corresponding plenum exit opening for receiving a portion of the air stream and for removing the light particulate material on the inside of the bag as the air stream passes in a forward direction therethrough;

a hollow central post mounted within the plenum for rotation about the plenum axis;

support arms mounted on the central post and extending radially outward therefrom for rotating with the central post;

a manifold mounted on the support arms radially spaced from the plenum axis corresponding to the radial position of the plenum exit openings for moving angularly about the plenum axis as the central post is rotated;

said manifold having a bearing plate for engaging and sliding over the interior surface of the top cover to sequentially cover the plenum exit openings as the manifold is angularly moved about the plenum axis;

said bearing plate having an aperture formed therein for directly communicating with one of said plenum exit openings when said one plenum exit opening is covered by the bearing plate;

said support arms being pivotally mounted to the central post for pivotal movement about a horizontal axis transverse to the direction of the radial extension of the support arms to enable the manifold to move upward with the bearing plate engaging the interior surface of the top cover and to move downward with the bearing plate spaced from the top cover;

spring means operatively connected to the support arms for biasing the manifold upward with the bearing plate normally bearing against the interior surface of the top cover;

a flexible duct extending between and in open communication with the manifold and the central post;

suction means operatively connected to the central post for producing a suction force within the central post that is communicated through the flexible duct and manifold to the bearing plate aperture; and drive means operatively connected to the central post for rotating the central post about the plenum axis to angularly move the manifold to sequentially cover the plenum exit openings with the bearing plate and to align the bearing plate opening with the plenum exit openings and to apply the suction force through the plenum exit openings to the interior of the bags to draw air through the bags in a reverse direction to remove the light particles from the inside of the bags.

2. The bag type air cleaning apparatus as defined in claim 1 wherein the means for removing the separated heavy particulate material includes:

a trough formed in and extending across the floor having a discharge opening at one end thereof;

a gathering means mounted on the central post for rotation therewith for moving the separated heavy particulate material into the trough;

an auger means mounted in the trough for moving the heavy particulate material along the trough and through the discharge opening; and an air valve means positioned and arranged with respect to the discharge opening for maintaining the discharge opening closed except when the heavy particulate material is being moved through the discharge opening by the auger means.

3. The bag type air cleaning apparatus as defined in claim 1 wherein the plenum exit openings are formed in a number of concentric circles about and radially spaced from the plenum axis, and wherein the manifold-bearing plate has a number of bearing plate openings corresponding with the number of concentric circles.

4. The bag type air cleaning apparatus as defined in claim 1 wherein each bag support includes spcaed parallel elongated frame elements that are interconnected by a plurality of spaced hoops that are pivotally mounted to the elongated frame members for movement between an operative position in which the hoops are oriented normal to the frame members to prevent the bags from collapsing when subjected to the suction force and an inoperative position in which the hoops are oriented parallel with the frame members to reduce the size of the bag supports.

* * * * *